United States Patent
Furuya

(10) Patent No.: US 10,987,756 B2
(45) Date of Patent: Apr. 27, 2021

(54) LASER PROCESSING SYSTEM

(71) Applicant: Fanuc Corporation, Yamanashi (JP)

(72) Inventor: Yoshitake Furuya, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 666 days.

(21) Appl. No.: 15/800,358

(22) Filed: Nov. 1, 2017

(65) Prior Publication Data

US 2018/0147662 A1    May 31, 2018

(30) Foreign Application Priority Data

Nov. 28, 2016   (JP) .............................. JP2016-230677

(51) Int. Cl.
| | | |
|---|---|---|
| B23K 26/067 | (2006.01) | |
| B23K 26/08 | (2014.01) | |
| B23K 37/02 | (2006.01) | |
| B23K 26/06 | (2014.01) | |

(52) U.S. Cl.
CPC ...... *B23K 26/0673* (2013.01); *B23K 26/0643* (2013.01); *B23K 26/0648* (2013.01); *B23K 26/083* (2013.01); *B23K 26/0823* (2013.01); *B23K 26/0884* (2013.01); *B23K 37/0235* (2013.01)

(58) Field of Classification Search
CPC ............ B23K 26/0643; B23K 26/0648; B23K 26/0673; B23K 26/0823; B23K 26/083; B23K 26/0884; B23K 37/0235
See application file for complete search history.

(56) References Cited

U.S. PATENT DOCUMENTS

| | | | |
|---|---|---|---|
| 6,153,853 A | 11/2000 | Maruyama et al. | |
| 8,716,622 B2 * | 5/2014 | Yoshikawa | B23K 26/082 |
| | | | 219/121.61 |
| 2017/0203388 A1 | 7/2017 | Matsuoka et al. | |

FOREIGN PATENT DOCUMENTS

| | | |
|---|---|---|
| CN | 101269442 A | 9/2008 |
| DE | 3700190 A1 | 10/1987 |
| DE | 102010025375 A1 | 12/2011 |
| GB | 2320698 A | 7/1998 |
| GB | 2326835 A | 1/1999 |
| JP | S57-178390 A | 11/1982 |
| JP | S63-154285 A | 6/1988 |

(Continued)

OTHER PUBLICATIONS

Japanese Patent Office; "Notice of Termination of Reconsideration by Examiners before Appeal Proceedings"; Appeal No. 2019-2161; Japanese Patent Application No. 2016-230677; Apr. 19, 2019; 1 page.

(Continued)

*Primary Examiner* — Dana Ross
*Assistant Examiner* — James F Sims, III
(74) *Attorney, Agent, or Firm* — Shackelford, Bowen, McKinley & Norton, LLP

(57) ABSTRACT

A laser processing system includes a laser oscillator, a laser beam emitting tool connected to the laser oscillator and supported by a first robot, the laser beam emitting tool emitting a laser beam supplied by the laser oscillator, and a laser processing tool which is supported by a second robot and which receives the laser beam emitted by the laser beam emitting tool and emits the laser beam toward a predetermined processing position.

6 Claims, 7 Drawing Sheets

(56) References Cited

FOREIGN PATENT DOCUMENTS

| | | |
|---|---|---|
| JP | H07-096384 A | 4/1995 |
| JP | H09-192868 A | 7/1997 |
| JP | H10-180471 A | 7/1998 |
| JP | H10-187223 A | 7/1998 |
| JP | 2001-340985 A | 12/2001 |
| JP | 2005254299 A | 9/2005 |
| WO | WO-2016013171 A1 | 1/2016 |

OTHER PUBLICATIONS

Okuzumi, Takashi; "Reconsideration Report by Examiner before Appeal"; Appeal No. 2019-2161; Japanese Application No. 2016-230677; Apr. 17, 2019; 7 pages.
Japan Patent Office, Office Action dated Jul. 10, 2018 for Japan Patent Application No. 2016-230677.
Japan Patent Office, Decision of Refusal dated Nov. 20, 2018 for Japan Application No. 2016-230677.
Kemmoku, Shoji; Notice of Reasons for Refusal for Japanese Application No. 2016-230677; dated Oct. 15, 2019; 8 pages.

\* cited by examiner

LASER PROCESSING SYSTEM

CROSS-REFERENCE TO RELATED APPLICATIONS

This application is based on and claims priority to Japanese Patent Application No. 2016-230677 filed on Nov. 28, 2016, the entire content of which is incorporated herein by reference.

TECHNICAL FIELD

The present invention relates to a laser processing system for emitting a laser beam generated by a laser oscillator toward a processing position.

BACKGROUND ART

As this type of laser processing system, a system that includes a portal frame provided in a plant in a manner extending in a width direction of a steel plate, and two laser processing tools disposed with the portal frame, with a gap in the width direction of the steel plate, and that simultaneously performs laser processing at two positions using the two laser processing tools is known (for example, see PTL 1).

This laser processing system includes a single laser oscillator supported on the portal frame, a light duct fixed to an upper surface of the portal frame while extending in the width direction of the steel plate, and a guide means connecting a light emitting portion of the laser oscillator and a center portion, in a longitudinal direction, of the light duct, the guide means guiding a laser beam from the laser oscillator into the light duct and refracting the laser beam from the laser oscillator toward one end and the other end of the light duct in the longitudinal direction, and thus, a laser beam from the single laser oscillator is supplied to the two laser processing tools.

CITATION LIST

Patent Literature

{PTL 1}
Japanese Unexamined Patent Application, Publication No. H7-96384

SUMMARY OF INVENTION

A laser processing system according to an aspect of the present invention includes a laser oscillator; a laser beam emitting tool connected to the laser oscillator and supported by a first robot, the laser beam emitting tool emitting a laser beam supplied by the laser oscillator; and a laser processing tool which is supported by a second robot and which receives the laser beam emitted by the laser beam emitting tool and emits the laser beam toward a processing position.

DESCRIPTION OF EMBODIMENTS

A laser processing system according to an embodiment of the present invention will be described below with reference to the drawings.

Figure 1:
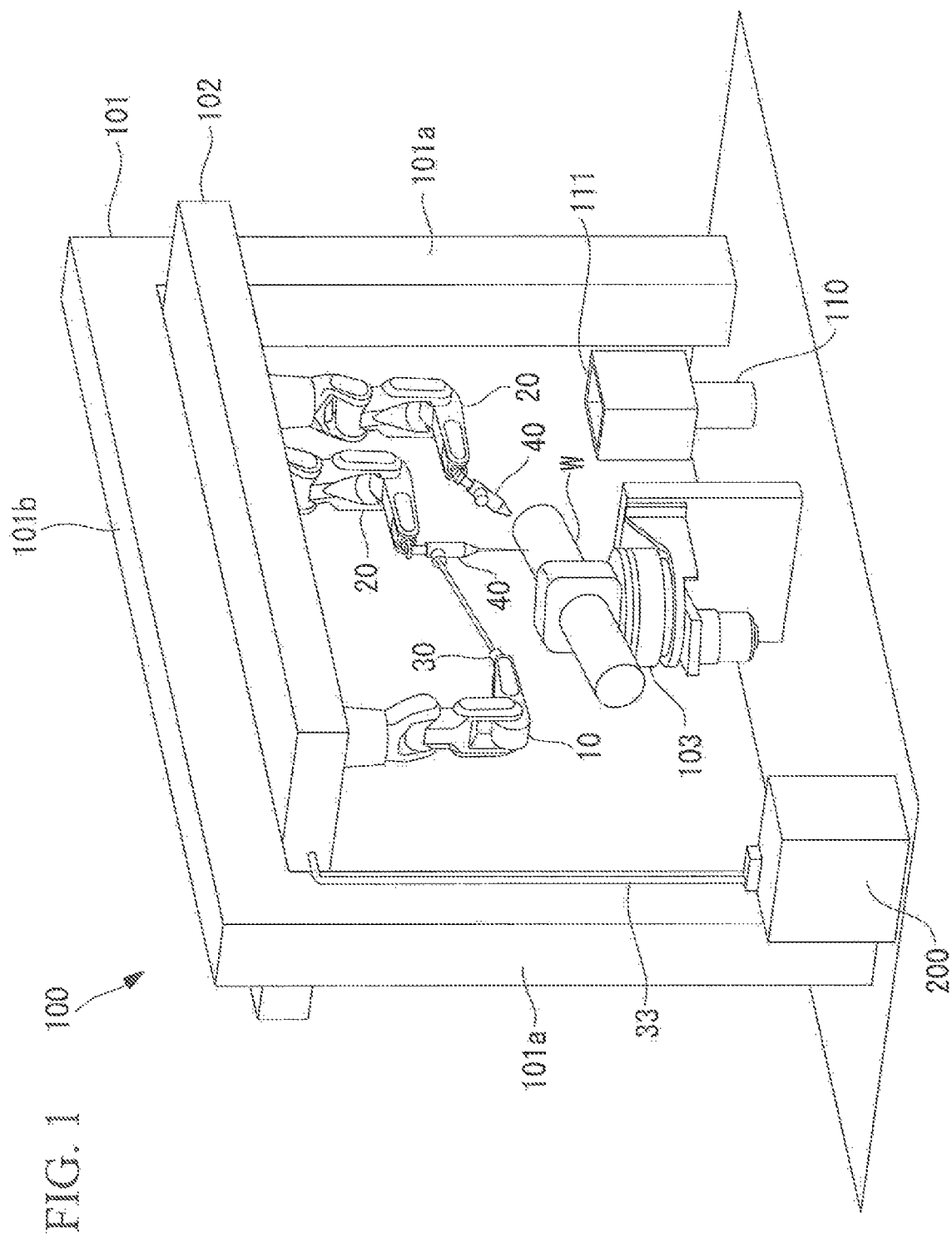
FIG. 1 is a perspective view of a laser processing system according to an embodiment of the present invention.

As shown in FIG. 1, the laser processing system includes a processing system main body 100, a first robot 10 and a plurality (in the present embodiment, two) of second robots 20 supported by the processing system main body 100, a laser beam emitting tool 30 supported at a distal portion of the first robot 10, a laser processing tool 40 supported at a distal portion of each second robot 20, a robot control unit 50, and a known laser oscillator 200 for supplying a laser beam to the laser beam emitting tool 30 through an optical fiber 33.

As shown in FIG. 1, the processing system main body 100 includes a portal frame 101 having a pair of strut sections 101a and a beam section 101b joining upper ends of the pair of strut sections 101a, a support member 102 fixed to the beam section 101b of the frame 101, and a workpiece support section 103 for supporting a workpiece W. Alternatively, instead of the portal frame 101, a processing chamber may be formed from a plurality of beam members and wall members, and the support member 102 may be fixed inside the processing chamber.

The laser oscillator 200 includes a laser control unit 201 (see FIG. 2) configured by a computer including a CPU, a RAM, a ROM and the like, and the intensity, the supply time, the timing and the like of a laser beam to be supplied to the laser beam emitting tool 30 are controlled by the laser control unit 201. In the present embodiment, the laser control unit 201 controls the intensity, the supply time, the timing and the like of a laser beam to be supplied to the laser beam emitting tool 30, based on a control command from a main controller 51 of the robot control unit 50 described later.

The first robot 10 includes a plurality of movable parts, and a plurality of servo motors 11 for driving respective movable parts. Various servo motors, such as a rotary motor and a linear motor, may be used as the servo motors 11. Each servo motor 11 has a built-in operation position detection device, such as an encoder, for detecting an operation position of the servo motor 11, and a detection value of the operation position detection device is transmitted to the robot control unit 50.

Each second robot 20 includes a plurality of movable parts, and a plurality of servo motors 21 for driving respective movable parts. Various servo motors, such as a rotary motor and a linear motor, may be used as the servo motors 21. Each servo motor 21 has a built-in operation position detection device, such as an encoder, for detecting an operation position of the servo motor 21, and a detection value of the operation position detection device is transmitted to the robot control unit 50.

Figure 2:
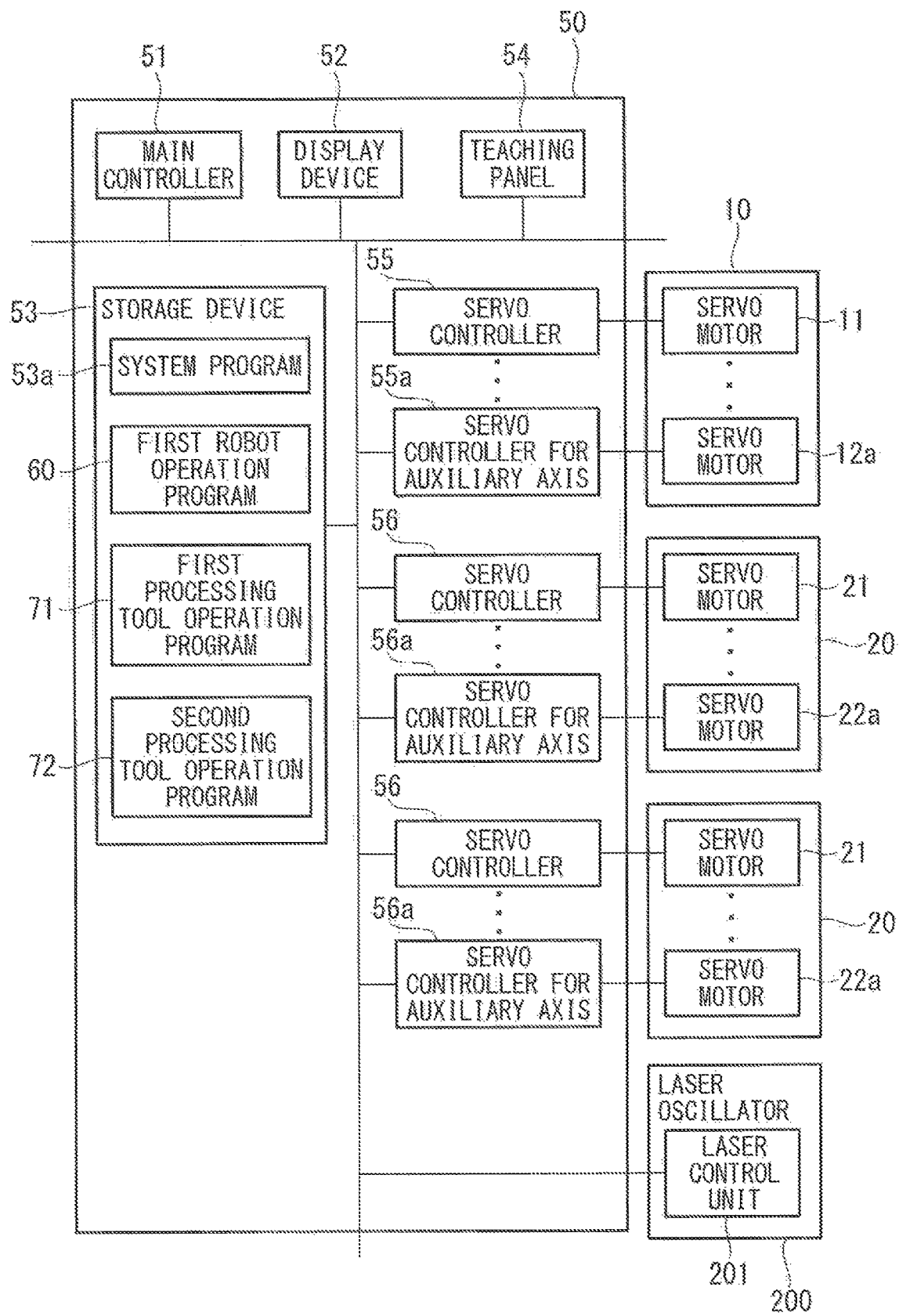
FIG. 2 is a block diagram of the laser processing system of the present embodiment.

For example, the robot control unit 50 includes a main controller 51 having a CPU, a RAM and the like, a display device 52, a storage device 53 having a non-volatile memory, a ROM and the like, a teaching panel 54 to be operated, for example, at the time of creating operation programs for the first robot 10 and the two second robots 20, a plurality of servo controllers 55 provided corresponding to respective servo motors 11 of the first robot 10, and a plurality of servo controllers 56 provided corresponding to respective servo motors 21 of the two second robots 20 (see FIG. 2).

A system program 53a is stored in the storage device 53, and the system program 53a serves a basic function of the robot control unit 50. Also, the storage device 53 stores at least one each of a first robot operation program 60, a first processing tool operation program 71, and a second processing tool operation program 72 created by using the teaching panel 54.

For example, the main controller 51 is operated by the system program 53a, and reads out the first robot operation program 60 stored in the storage device 53, temporarily stores the first robot operation program 60 in the RAM, transmits control signals to servo controllers 55 according to the read-out first robot operation program 60, and thereby controls servo amplifiers of the servo motors 11 of the first robot 10. For example, the first robot operation program 60 is created to control the position and posture of the laser beam emitting tool 30 supported by the first robot 10.

Furthermore, the main controller 51 reads out the first processing tool operation program 71 stored in the storage device 53, temporarily stores the first processing tool operation program 71 in the RAM, transmits control signals to servo controllers 56 according to the read-out first processing tool operation program 71, and thereby controls servo amplifiers of the servo motors 21 of one of the second robots 20.

Furthermore, the main controller 51 reads out the second processing tool operation program 72 stored in the storage device 53, temporarily stores the second processing tool operation program 72 in the RAM, transmits a control signals to servo controllers 56 according to the read-out second processing tool operation program 72, and thereby controls servo amplifiers of the servo motors 21 of the other second robot 20. For example, the first and second processing tool operation programs 71, 72 are each created to control the position and posture of the laser processing tool 40 supported by the corresponding second robot 20.

Figure 3:
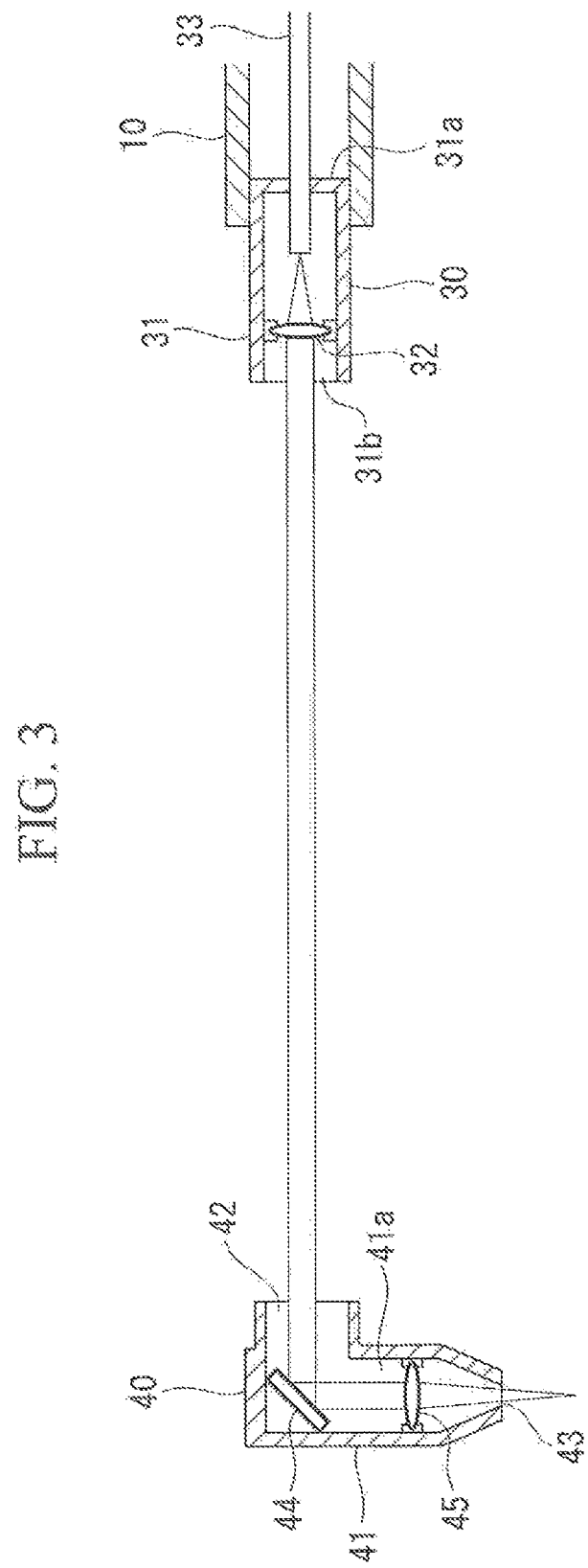
FIG. 3 is a diagram for explaining operation of the laser processing system of the present embodiment.

As shown in FIG. 3, the laser beam emitting tool 30 includes a cylindrical member 31 supported at a distal portion of the first robot 10, and a focusing lens 32 provided inside the cylindrical member 31. An end wall 31a is provided at one end of the cylindrical member 31 in an axial direction, and a distal portion of the optical fiber 33 is disposed inside the cylindrical member 31 through a hole provided in the end wall 31a. A laser beam emitted from the optical fiber 33 in a spreading manner is made to be a substantially parallel laser beam by the focusing lens 32, and is emitted from an opening portion 31b at the other end of the cylindrical member 31 in the axial direction.

As shown in FIG. 3, each laser processing tool 40 includes a processing tool main body 41, inside which a hollow portion 41a is formed, an opening portion 42 for letting the substantially parallel laser beam from the laser beam emitting tool 30 into the hollow portion 41a, an emission aperture 43 for letting the laser beam which has entered into the hollow portion 41a out of the processing tool main body 41, a reflection member 44 for reflecting, toward the emission aperture 43 side, the laser beam which has entered into the hollow portion 41a through the opening portion 42, and a focusing lens 45 for focusing the laser beam from the reflection member 44 toward a processing position through the emission aperture 43.

Figure 5:
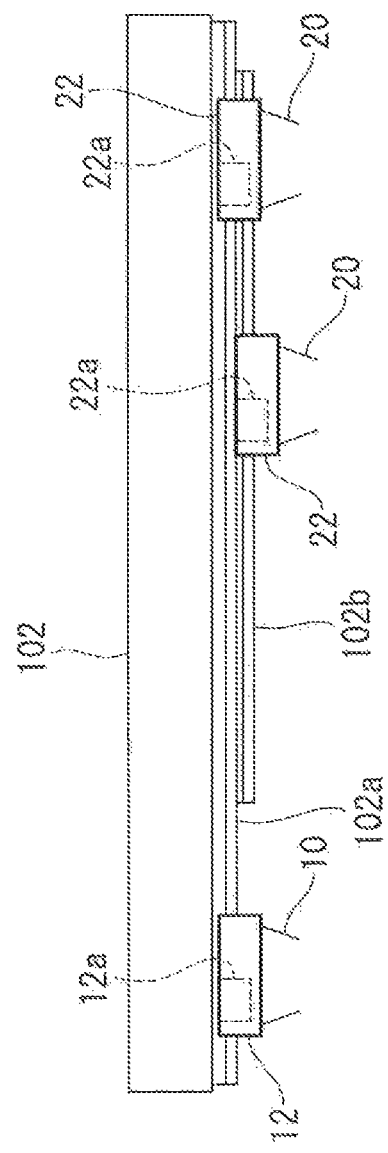
FIG. 5 is a front view of an essential part of the laser processing system of the present embodiment.

As shown in FIG. 5, a base section 12 of the first robot 10 and base sections 22 of the two second robots 20 are each supported by a rail 102a or a rail 102b provided on a lower surface of the support member 102. The base section 12 is movably supported by the rail 102a along the longitudinal direction of the rail 102a, and moves along the rail 102a by a servo motor 12a, which is a drive device built in the base section 12.

One of the base sections 22 is movably supported by the rail 102a along the longitudinal direction of the rail 102a, and moves along the rail 102a by a servo motor 22a, which is a drive device built in the base section 22. Moreover, the other base section 22 is movably supported by the rail 102b along the longitudinal direction of the rail 102b, and moves along the rail 102b by a servo motor 22a, which is a drive device built in the base section 22. Each of the servo motors 12a, 22a also includes an operation position detection device.

As shown in FIG. 2, the robot control unit 50 includes servo controllers 55a, 56a for auxiliary axes corresponding, respectively, to the servo motor 12a and the two servo motors 22a, and the main controller 51 transmits control signals to the servo controller 55a according to the first robot operation program 60, and transmits control signals to the servo controllers 56a according to the first and second processing tool operation programs 71, 72.

Figure 6:
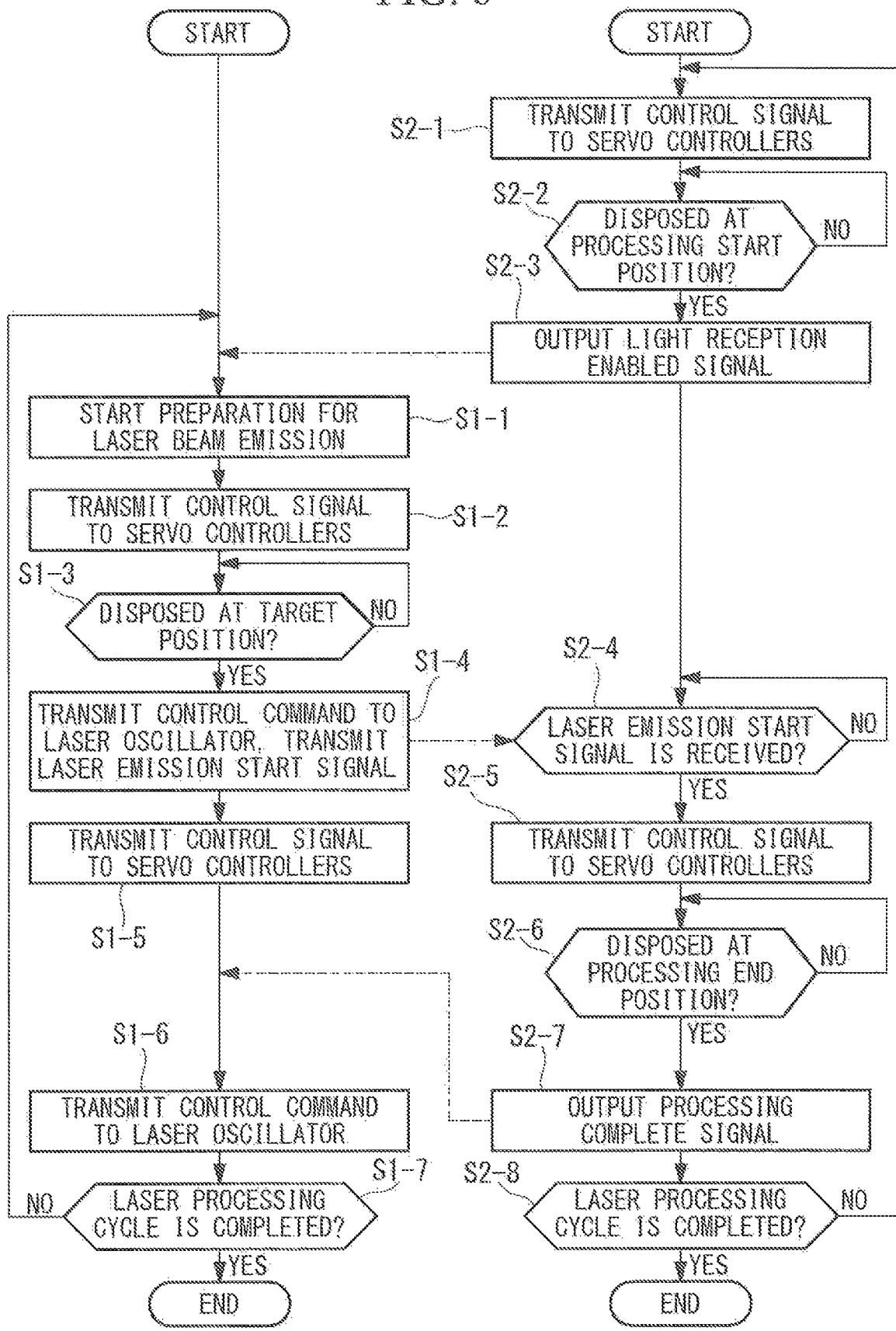
FIG. 6 is a flowchart showing operation of a main controller of a robot control unit of the laser processing system of the present embodiment.

Example operation of the main controller 51 of the robot control unit 50 of the laser processing system configured in the above manner will be described below with reference to FIG. 6. In the following example, control of the first robot 10 according to the first robot operation program 60 (first robot control), and control of the two second robots 20 according to the first and second processing tool operation programs 71, 72 (second robot control) are performed in parallel, and transmission of a control command from the main controller 51 to the laser control unit 201 of the laser oscillator 200 is also performed.

First, when a processing start signal instructing a start of the processing, for example, is received by the main controller 51, the second robot control is started, and control signals are transmitted to each servo controller 56, 56a such that the laser processing tool 40 supported by one of the second robots 20 is disposed at a processing start position (step S2-1). Then, when the main controller 51 determines, based on detection values of the operation position detection devices of the servo motors 21 of the one second robot 20, that the laser processing tool 40 is disposed at the processing start position (step S2-2), a light reception enabled signal indicating that the laser processing tool 40 of the one second robot 20 has reached a state where the laser processing tool 40 is able to receive light is output for the first robot control (step S2-3).

Additionally, at the processing start position, the opening portion 42 of the laser processing tool 40 faces the laser beam emitting tool 30 supported by the first robot 10, but the opening portion 42 of the laser processing tool 40 does not have to face the laser beam emitting tool 30 until the laser processing tool 40 reaches the processing start position.

On the other hand, in relation to first robot control, the main controller 51 receives the light reception enabled signal of step S2-3, and based on the signal, determines based on the first robot operation program 60 whether to start preparation for laser beam emission of emitting a laser beam toward the laser processing tool 40 of the one second robot 20, and if the start is determined, the preparation for laser beam emission is started (step S1-1).

In this example, a description is given about one of the second robots 20 and its laser processing tool 40, but the same process is also performed for the other second robot 20 and its laser processing tool 40. Also, in this example, the first robot operation program 60 is created in such a way that preparation for laser beam emission is started first for the laser processing tool 40 of one of the second robots 20.

The main controller 51 starts the preparation for laser beam emission, and transmits control signals to the servo controllers 55, 55*a* such that the laser beam emitting tool 30 faces the opening portion 42 of the laser processing tool 40 of the one second robot 20 (step S1-2). Then, when the main controller 51 determines, based on detection values of the operation position detection devices of the servo motors 11, that the laser beam emitting tool 30 is disposed at a target position (step S1-3), a control command including instructions regarding the intensity, the supply time, the timing and the like of the laser beam to be supplied to the laser beam emitting tool 30 is transmitted to the laser control unit 201 of the laser oscillator 200, and a laser emission start signal indicating that the control command has been transmitted to the laser oscillator 200 is output for the second robot control (step S1-4).

Next, as the second robot control, when the main controller 51 receives the laser emission start signal of step S1-4 (step S2-4), control signals are transmitted to the servo controllers 56, 56*a* such that the laser processing tool 40 moves from the processing start position to a processing end position at a predetermined speed and along a predetermined track (step S2-5).

Figure 4:
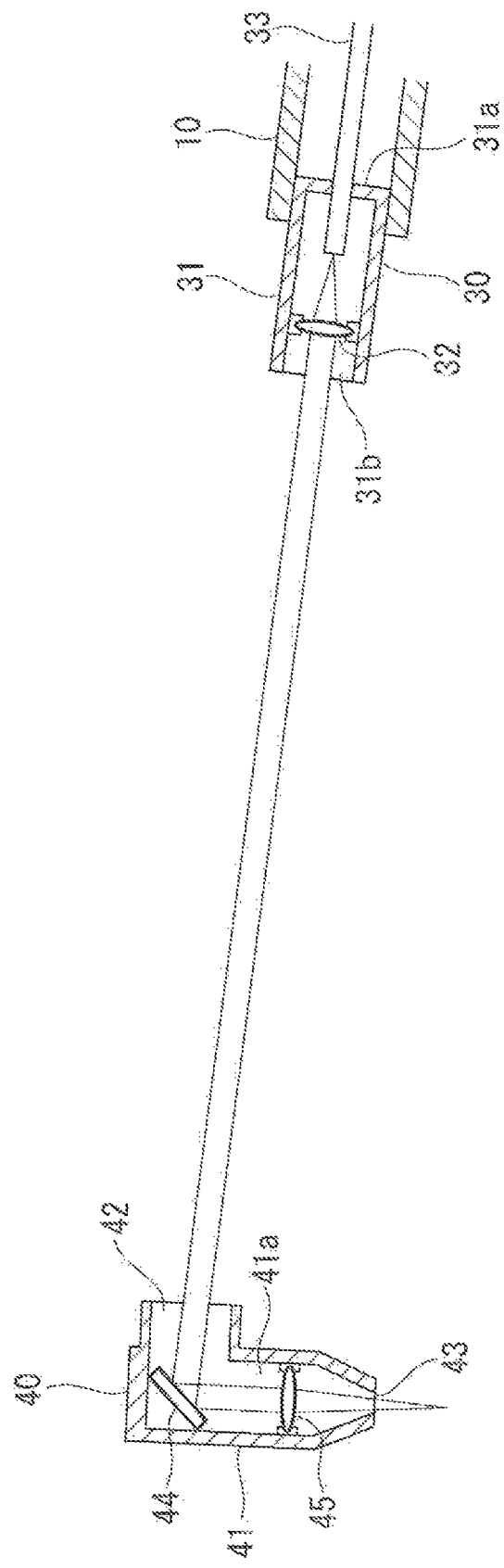
FIG. 4 is a diagram for explaining operation of the laser processing system of the present embodiment.

While the one second robot 20 is operating as described in step S2-5, the main controller 51 transmits, as the first robot control, control signals to the servo controllers 55, 55*a*, based on detection values of the operation position detection devices of the servo motors 21, 22*a* of the one second robot 20, such that the state where the laser beam emitting tool 30 is facing the opening portion 42 of the laser processing tool 40 is maintained (step S1-5). Accordingly, the first robot 10 operates in a manner of following the second robot 20, and a state as shown in FIG. 4 is reached, for example. Such robot control is sometimes referred to as coordinated control.

Additionally, in FIG. 4, when the laser processing tool 40 is gradually moved upward, the laser beam emitting tool 30 is gradually tilted upward, and the state where the laser beam emitting tool 30 is facing the opening portion 42 of the laser processing tool 40 is thereby maintained, but not limited to such an example. For example, when the laser processing tool 40 is gradually moved upward, the laser beam emitting tool 30 may be gradually moved upward so as to be disposed at the same height position as the laser processing tool 40. Also, when the laser processing tool 40 is gradually moved in the horizontal direction, the laser beam emitting tool 30 may be gradually tilted in the horizontal direction, or may be gradually moved in the horizontal direction.

Subsequently, as the second robot control, when the main controller 51 determines that the laser processing tool 40 is disposed at the processing end position, based on detection values of the operation position detection devices of the servo motors 21 of the one second robot 20 (step S2-6), a processing complete signal indicating that processing is completed is output for the first robot control (step S2-7).

Next, as the first robot control, the main controller 51 transmits, to the laser control unit 201 of the laser oscillator 200, a control command including a stop instruction for supply of a laser beam to the laser beam emitting tool 30 (step S1-6). Then, the main controller 51 determines whether a laser processing cycle using the laser processing tool 40 of the one second robot 20 and the laser processing tool 40 of the other second robot 20 is completed (step S1-7, step S2-8), and if the cycle is not completed, processing is performed again from steps S1-1 and S2-1.

For example, if the light reception enabled signal is received in step S1-1 for the laser processing tool 40 of the other second robot 20, steps S1-2 to S1-6 are performed for this laser processing tool 40.

Moreover, during or before or after the processing described above, the other second robot 20 may be moved near the next processing position by control of the servo motor 22*a* while laser processing is being performed by the laser processing tool 40 of the one second robot 20. Furthermore, the servo motor 12*a* may be controlled, and the first robot 10 may be moved to a position suitable for emission of a laser beam to the laser processing tool 40.

According to the present embodiment, the laser beam emitting tool 30 supported by the first robot 10 emits a laser beam from the laser oscillator 200, and the laser processing tool 40 supported by the second robot 20 receives the laser beam emitted by the laser beam emitting tool 30. Therefore, even when the laser processing tool 40 supported by the second robot 20 is not connected to the laser oscillator 200 by an optical fiber or the like, the laser processing tool 40 is able to emit a laser beam toward a processing position. Accordingly, movement of the second robot 20 supporting the laser processing tool 40 is not restricted by an optical fiber.

Also, the plurality of second robots 20 are movably supported by a robot support mechanism including the support member 102 and the rails 102*a*, 102*b*, and thus, movement of one second robot 20 or positioning of the laser processing tool 40 supported by one second robot 20 may be performed in a state where a laser beam is supplied by the laser beam emitting tool 30 of the first robot 10 to the laser processing tool 40 of the other second robot 20, for example. In this case, the position where laser processing is to be performed may be changed in a short time simply by switching the supply destination of the laser beam from the laser beam emitting tool 30 to the laser processing tool 40 of the one second robot 20.

Furthermore, the robot control unit 50 controls the first robot 10 such that the position and/or the posture of the laser beam emitting tool 30 are/is changed according to the position of the laser processing tool 40, and also controls the emission time of a laser beam from the laser beam emitting tool 30.

According to this configuration, the position and/or the posture of the laser beam emitting tool 30 supported by the first robot 10 are/is changed according to the position of the laser processing tool 40 supported by the second robot 20. Also, because the emission time of a laser beam from the laser beam emitting tool 30 is controlled, the emission time of a laser beam from the laser processing tool 40 supported by the second robot 20 is also controlled. Accordingly, setting of processing conditions of laser processing may be easily performed.

Figure 7:
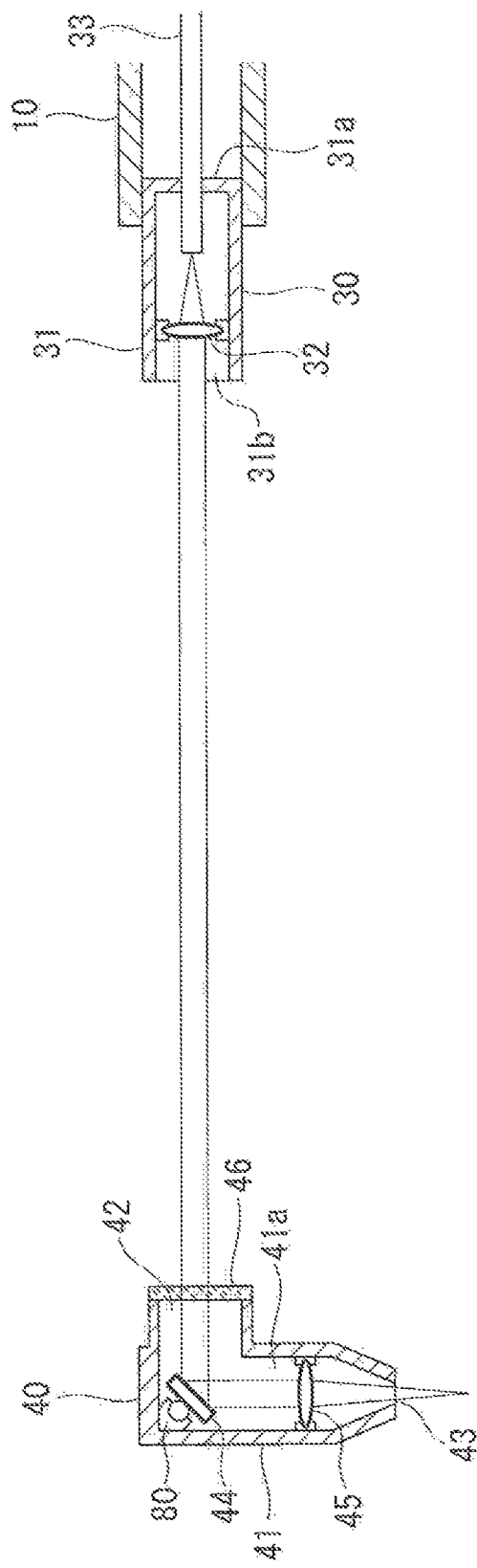
FIG. 7 is a cross-sectional view of an essential part, showing an example modification of the laser processing system of the present embodiment.

Additionally, the laser processing tool 40 may include a dustproof window 46, which is a translucent member where a laser beam passes through before reaching the reflection member 44 (see FIG. 7). This configuration is advantageous in preventing a change in the quality of laser processing caused by stain, flaw, breakage or the like of the reflection member 44 for receiving a laser beam.

Furthermore, the processing system main body 100 may be provided with a cleaning device 110 for cleaning the dustproof window 46 (see FIG. 1). For example, the cleaning device 110 includes a cleaning container 111 into which the laser processing tool 40 may be inserted by the second robot 20, a cleaning means, such as a cleaning spray or a cleaning brush, disposed inside the cleaning container 111, a drying device, such as a blow device for drying, and the like.

According to this configuration, cleaning of the dustproof window 46 of the laser processing tool 40 may be performed without an operator coming into or near a space where a laser beam is emitted. Accordingly, safety of operation may be increased, and also, the quality of laser processing may be increased by increasing the frequency of cleaning of the dustproof window 46.

Additionally, in the present embodiment, a laser beam from the laser beam emitting tool 30 may be received at the laser processing tool 40 by a single or a plurality of lenses instead of, or together with, the reflection member 44, and a laser beam caused by the lens(es) to enter the hollow portion 41a through the opening portion 42 may be guided toward the emission aperture 43 through the focusing lens 45.

Moreover, in the present embodiment, the robot control unit 50 may be dedicated to the first robot 10 and another robot control unit may be provided for the second robot 20, and first robot control may be performed by the robot control unit 50 and second robot control may be performed by the other robot control unit.

Moreover, in the present embodiment, the laser oscillator 200 may be directly controlled by the robot control unit 50, without providing the laser control unit 201.

Furthermore, as shown in FIG. 7, the reflection member 44 may be caused to swing with respect to the processing tool main body 41 by a drive device 80, such as a motor. When such a configuration is adopted, the position of the reflection member 44 in the swing direction may be adjusted according to the incident angle of a laser beam entering the hollow portion 41a from the opening portion 42, and thus, various incident angles can be coped with. In this case, the drive device 80 is controlled by the main controller 51 operating based on the first or second processing tool operation program 71, 72.

The inventor has arrived at the following aspects of the present invention.

A laser processing system according to an aspect of the present invention includes a laser oscillator; a laser beam emitting tool connected to the laser oscillator and supported by a first robot, the laser beam emitting tool emitting a laser beam supplied by the laser oscillator; and a laser processing tool which is supported by a second robot and which receives the laser beam emitted by the laser beam emitting tool and emits the laser beam toward a processing position.

According to this aspect, the laser beam emitting tool supported by the first robot emits a laser beam from the laser oscillator, and the laser processing tool supported by the second robot receives the laser beam emitted by the laser beam emitting tool. Accordingly, for example, even if the laser processing tool supported by the second robot is not connected to the laser oscillator by an optical fiber, the laser processing tool is able to emit a laser beam toward a processing position, and movement of the second robot supporting the laser processing tool is not restricted by an optical fiber.

In the aspect described above, it may be preferable that the system comprises a plurality of the second robots each of which is supporting the laser processing tool. According to such a configuration, movement of another one of the plurality of second robots or movement of the laser processing tool supported by the second robot to the next processing position or the like may be performed in a state where a laser beam is supplied by the laser beam emitting tool to the laser processing tool of one of the second robots. In this case, the position where laser processing is to be performed may be changed in a short time simply by switching the supply destination of the laser beam from the laser beam emitting tool to the laser processing tool of another second robot.

In the aspect described above, a robot support mechanism for movably supporting each of the plurality of second robots may be preferably provided. According to such a configuration, for example, the position of the laser processing tool supported by another one of the plurality of second robots may be greatly changed in a state where a laser beam is being supplied by the laser beam emitting tool to the laser processing tool of one of the second robots.

In the aspect described above, it may be preferable that the system has a controller which controls the first robot such that at least one of a position and posture of the laser beam emitting tool is changed according to a position of the laser processing tool and which controls an emission time of the laser beam from the laser beam emitting tool.

According to this configuration, the position and/or the posture of the laser beam emitting tool supported by the first robot are/is changed according to the position of the laser processing tool supported by the second robot, and the emission time of a laser beam from the laser beam emitting tool is controlled, and thus, the emission time of a laser beam from the laser processing tool supported by the second robot is also controlled, and setting of processing conditions of laser processing may be easily performed.

In the aspect described above, the laser processing tool preferably includes a lens or a reflection member for receiving the laser beam emitted by the laser beam emitting tool, and a dustproof window through which the laser beam passes before reaching the lens or the reflection member.

This configuration is advantageous in preventing a change in the quality of laser processing caused by stain, flaw, breakage or the like of the lens or the reflection member for receiving a laser beam at the laser processing tool.

In the aspect described above, a cleaner for cleaning the dustproof window may be provided.

According to this configuration, cleaning of the dustproof window of the laser processing tool may be performed without an operator coming into or near a space where a laser beam is emitted. Accordingly, safety of operation may be increased, and also, the quality of laser processing may be increased by increasing the frequency of cleaning of the dustproof window.

According to the aforementioned aspects, the degree of freedom of movement of a laser processing tool by a robot may be increased, and also, the cycle time may be reduced.

REFERENCE SIGNS LIST 10 first robot
20 second robot
30 laser beam emitting tool
33 optical fiber
40 laser processing tool
42 opening portion
43 emission aperture
44 reflection member
45 focusing lens 46 dustproof window
50 robot control unit
51 main controller
100 processing system main body
101 frame
102 support member
103 workpiece support section
200 laser oscillator
201 laser control unit
110 cleaning device
111 cleaning container
W workpiece

The invention claimed is:

1. A laser processing system comprising:
   a laser oscillator;
   a laser beam emitting tool which is connected to the laser oscillator through an optical fiber and supported by a first robot, the laser beam emitting tool comprises a lens which makes a laser beam supplied by the laser oscillator substantially parallel and emits the substantially parallel laser beam; and
   a laser processing tool which is supported by a second robot and which receives the laser beam emitted by the laser beam emitting tool and emits the laser beam toward a processing position, the laser processing tool comprising:
      a main body with a hollow portion formed therethrough;
      a reflector positioned within the hollow portion; and
      a focusing lens positioned within the hollow portion for focusing the laser beam from the reflector.

2. The laser processing system according to claim 1, wherein the system comprises a plurality of laser processing tools including the laser processing tool and a plurality of second robots including the second robot, wherein each of the plurality of second robots supports a respective one of the plurality of laser processing tools.

3. The laser processing system according to claim 2, further comprising a rail movably supporting each of the plurality of the second robots.

4. The laser processing system according to claim 1, further comprising a controller which controls the first robot such that at least one of a position and posture of the laser beam emitting tool is changed according to a position of the laser processing tool and which controls an emission time of the laser beam from the laser beam emitting tool.

5. The laser processing system according to claim 1, wherein the laser processing tool includes a dustproof window through which the laser beam passes before reaching the reflector.

6. The laser processing system according to claim 5, further comprising a cleaner for cleaning the dustproof window.

* * * * *